3,335,119
FUSIBLE, CONVERTIBLE ALKENYL ARYL POLYMERS

Gaetano F. D'Alelio, South Bend, Ind., assignor, by direct and mesne assignments, to Dal Mon Research Co., Cleveland, Ohio, a corporation of Delaware
No Drawing. Filed Aug. 8, 1963, Ser. No. 300,902
21 Claims. (Cl. 260—89.1)

This invention is concerned with the production of soluble, fusible alkenyl aryl polymers which are convertible to the infusible, insoluble state. Specifically, this invention deals with monomers of the general formula $$CH_2=\overset{R}{\underset{|}{C}}-Ar-D$$

and linear polymers prepared therefrom, wherein R represents hydrogen and methyl radicals, —Ar— represents an arylene radical containing six to eighteen carbon atoms, and D represents a group containing at least one —CR=CH$_2$ group therein attached directly or indirectly to the —Ar— groups, and is more fully described hereinafter.

It is an object of this invention to prepare linear, soluble, fusible polymers convertible to the insoluble, infusible state from these $$CH_2=\overset{R}{\underset{|}{C}}-Ar-D$$

monomers (A) which have the repeating unit

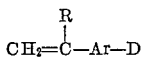

in their structures. It is also a further purpose of this invention to prepare copolymers of other monomers with the monomers, $$CH_2=\overset{R}{\underset{|}{C}}-Ar-D$$

of this invention and for said copolymers to be also soluble, fusible and convertible to the infusible state.
The monomers of the formula $$CH_2=\overset{R}{\underset{|}{C}}-Ar-D$$

used in the practice of this invention possess a multiplicity of double bonds, one of which is the $$CH_2=\overset{R}{\underset{|}{C}}-$$

grouping and at least one other —CR=CH$_2$ grouping located in the D function. In some cases, there may be two or more —CR=CH$_2$ groupings in the D function. In these monomers, D represents a member selected from the class of —ZR", —OR", —SR", —COOR", —OZCOOR", ZCOOR", —ZOR",

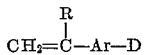

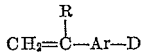

—N(COOR")$_2$ and —SO$_2$OR", in which R' is a radical selected from the class of hydrocarbon radicals containing one to ten carbon atoms and R", Z is a divalent aliphatic hydrocarbon radical of one to ten carbon atoms, and R" is a radical selected from the class of alkenyl, alkenyloxy alkyl, and alkenylthioalkyl radicals, said radicals containing two to ten carbon atoms and possessing a terminal CH$_2$=C< grouping. The arylene radical is preferably hydrocarbon with no substituents on the aromatic nucleus or with alkyl or aryl radicals substituted thereon. However, an arylene group having a second D radical, while generally regarded as imparting more unsaturation than is necessary, is also considered suitable for the purposes of this invention.

Normally, when monomers of this type are polymerized thermally or with free radical initiators, insoluble, infusible crosslinked polymers are obtained, similar to the cases of divinyl benzene, CH$_2$=CHC$_6$H$_4$CH=CH$_2$, and vinylisopropenyl benzene, $$CH_2=CHC_6H_4\overset{CH_3}{\underset{|}{C}}=CH_2$$

and these infusible polymers cannot be fabricated to other shapes by molding, laminating, etc. techniques. Insoluble, infusible polymers are also obtained when cationic initiators such as the Lewis acids, for example, BF$_3$, H$_2$SO$_4$, AlCl$_3$, TiCl$_4$, HF, etc., are used as polymerization catalysts. It is therefore a purpose of this invention to prepare fabricable, soluble, fusible polymers from the $$CH_2=\overset{R}{\underset{|}{C}}-Ar-D$$

monomers used in the practice of this invention, and these polymers will be linear in structure, having the repeating unit,

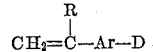

which repeating structures, for the illustrative examples of such monomers given hereinabove, are

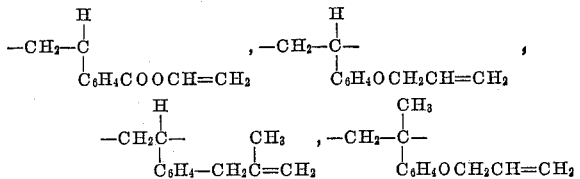

Monomers falling within the class of $$CH_2=\overset{R}{\underset{|}{C}}-Ar-D$$

monomers are exemplified by, but not limited to, the following monomers:

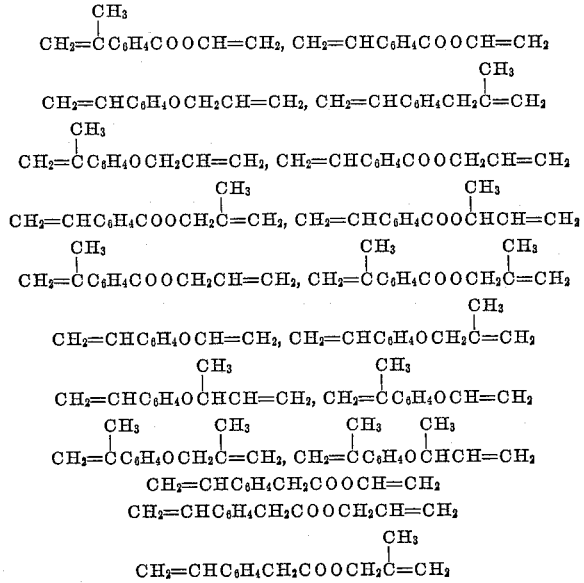

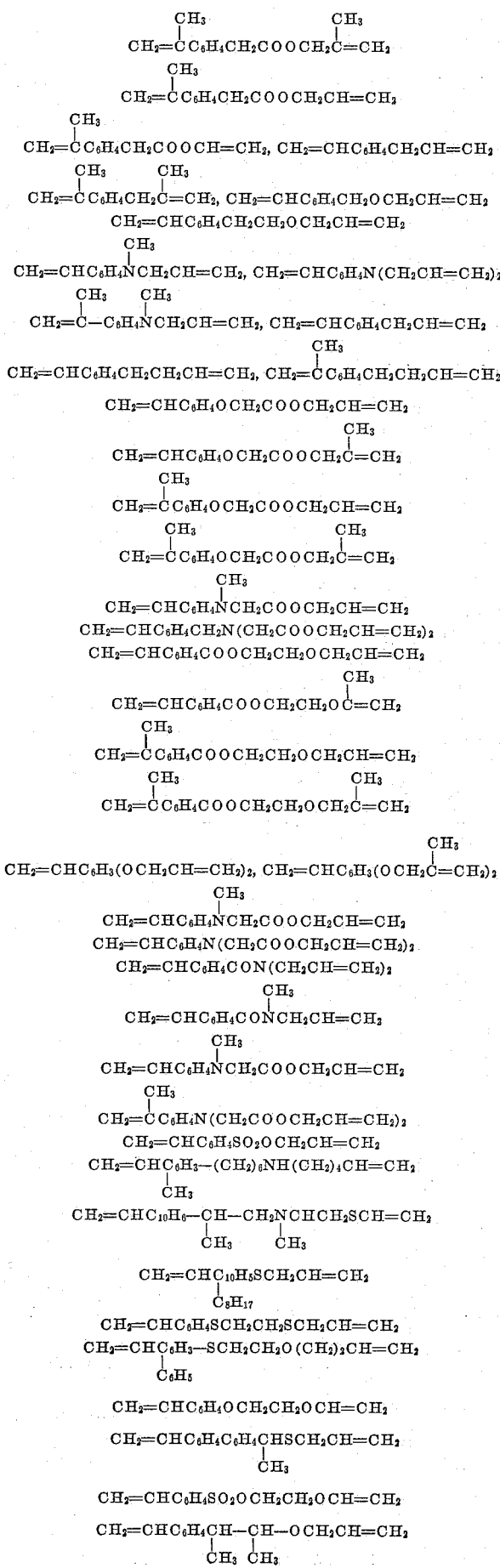

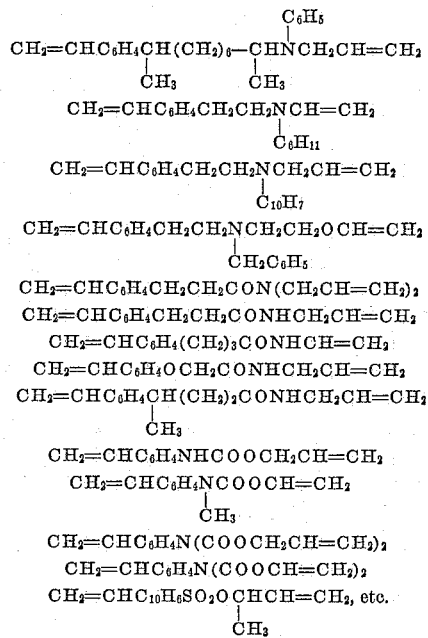

I have now discovered that useful, linear soluble polymers and copolymers are readily obtained when a base catalyzed polymerization is performed, such as in an anionic initiated polymerization with these monomers. By a base-catalyzed polymerization is meant a polymerization in which the propagation of the polymer chain occurs through a carbanion. Thus, by rewriting the monomer

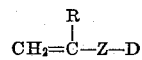

as

then

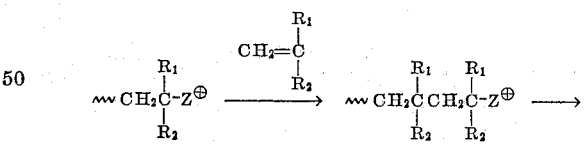

etc., in which Z is a positive counter ion, usually metal, typically an alkali or alkaline earth metal. The propagation step is preceded by an initiation step and the initiation may be brought about in a number of ways.

The anionic polymerization can be initiated by an alkali metal hydride such as NaH, LiH, etc., KH, CsH, KAlH$_4$, etc., LiAlH$_4$, etc. Designating such hydrides as MH, then the initiating step is

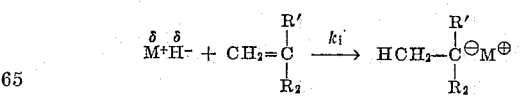

When an alkali metal alkyd is used, the initiating step is given as

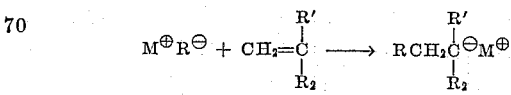

in which the cation $M^{\oplus}$ represents Li, Na, K, Cs, etc., and the anion $R^-$ represents methyl, ethyl, propyl, isopropyl, butyl, amyl, isoamyl, benzyl, triphenyl, methyl, phenyl, octyl, etc. A few typical examples of MR are

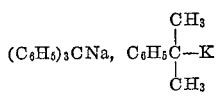

BuLi, $C_6H_5CH_2Cs$, allyl sodium, etc. A Grignard reagent, RMgX, may also be used to initiate an anionic polymerization, thus

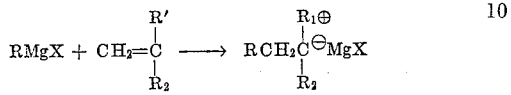

Illustrative examples of RMgX are phenyl magnesium bromide, butyl magnesium bromide and chloride, vinyl magnesium bromide, allyl magnesium bromide, etc.

The free alkali metals may also be used to initiate polymerization, especially when the metal, M°, gives up an electron to form an ion radical of the monomer, thus

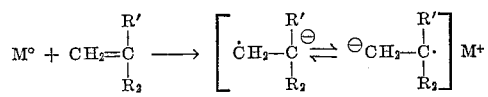

The ion radicals couple to form a dianion, thus

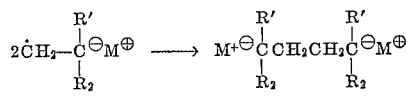

as a step in the initiation mechanism.

A similar mechanism occurs in the anionic initiaton using an alkali metal and a polycyclic aromatic hydrocarbon, e.g., naphthalene, anthracene, α-methyl styrene tetramer, etc., as illustrated by naphthalene, thus

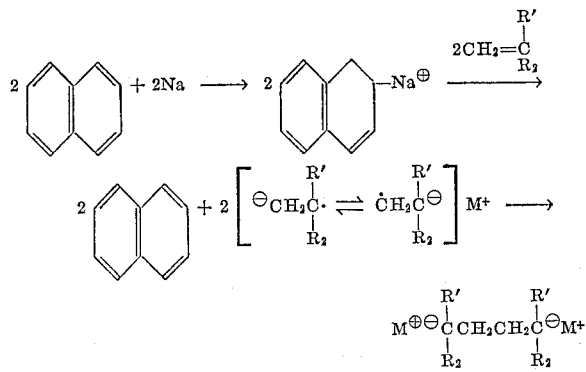

The alkali metals in liquid ammonia are also effective anionic polymerization initiators which may function in either of two ways, e.g., in the case of potassium or sodium in liquid ammonia the resulting amide functions as the initiator, thus

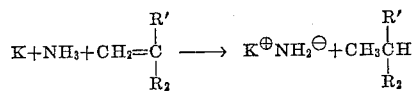

then

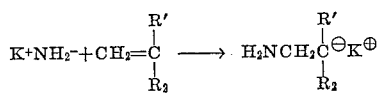

while in the case of lithium an ion radical is formed in the reaction which acts as the initiator, thus

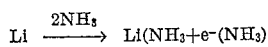

where e⁻ is an electron, then

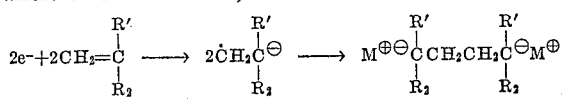

In the ammonia-amide series, the order of reactivity of the cations is given as

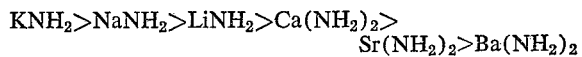

In a similar way anionic initiation may be brought about by ketyls which are the reaction products of an alkali or alkaline metal with a ketone such as benzophenone in ether, thus

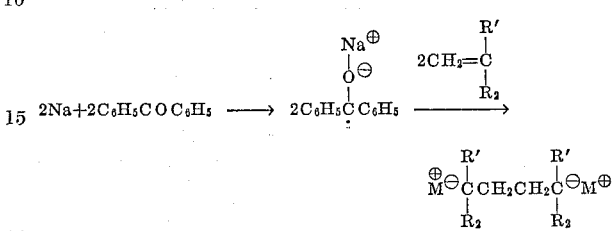

The anionic polymerization may be performed with the monomers of this invention, alone or in the presence of a liquid diluent, at temperatures ranging from about −80° C. to 80° C. but for most monomers the range of −40° C. to 60° C. is satisfactory; in general, −20° C. to 40° C. is advantageous. The solvent, or diluents, when used may be selected from the class of aliphatic and aromatic hydrocarbons, ketones, ethers and esters, such as butane, propane, hexane, heptane, octane, benzene, toluene, xylene, dimethyl ether, diethyl ether, dibutyl ether, tetrahydrofurane, dioxane, diphenyl ether, dibenzyl ether, dimethyl ethylene glycol ether, dibutyl ethylene glycol ether, diethyldiethylene glycol ether, etc. The diluent or solvent can also act to control the molecular weight of the polymerization by solvolitic chain transfer with the anion when protonic solvents are used, thus

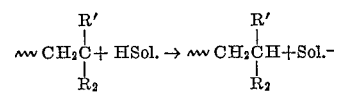

Anion polymerizations are sometimes referred to as base catalyzed polymerizations.

Not all alkenyl aryl monomers containing a

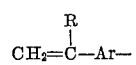

group and —CR=$CH_2$ group can be converted to linear, soluble, fusible polymers by means of anionic initiation. For example, divinyl benzene, $CH_2$=$CHC_6H_4CH$=$CH_2$; vinyl isopropenyl benzene,

diisopropenyl benzene,

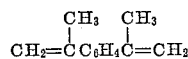

and related compounds produce insoluble, infusible polymers because both alkenyl groups are responsive to anionic conditions. For the practice of this invention I have discovered that the alkenyl aryl compound must possess only one

group responsive to anionic initiation and that the other —CH=$CH_2$ must be unresponsive to anion conditions.

By reference to the compounds given as illustration for the

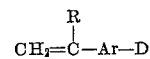

monomers, it will be observed that the second or third $CH_2=CR-$ group in D cannot be attached directly to the

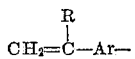

grouping and that at least one other atom, e.g., a carbon or hetero- atom, e.g.,

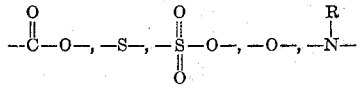

etc. must interrupt the bonding between the

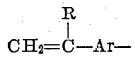

grouping and the $-CR=CH_2$, thereby excluding the divinyl, the diisopropenyl or the vinyl isopropenyl aryl monomers.

Once prepared, the soluble, fusible, linear polymers of this invention are converted to the insoluble, infusible state by heat alone or in the presence of oxygen or other deliberately added catalyst, preferably radical generating catalysts, e.g., peroxides such as benzoyl peroxide, naphthyl peroxide, phthalyl peroxide, tertiary butyl hydroperoxide, hydrogen peroxide, cyclohexyl hydroperoxide, methyl ethyl ketone peroxide, tertiary butyl perbenzoate, cumene hydroperoxide, azo catalyst such as 2,2′-azobisisobutyronitrile, etc., alone or in the presence of redox agents as well as U.V. light and ionizing radiation. The term irradiation as used herein means high energy radiation and/or secondary radiation from electrons, neutrons, X-ray machines, linear accelerators, cobalt 60, etc., gamma radiation, etc., from electrons, protons, neutrons, etc., said energies being at least about 100,000 electron volts. They can also be converted to the insoluble state by cationic or Lewis acid catalysts, such as $HF.(C_2H_5)_2O$, $BF_3$, $AlC_3$, $H_3PO_4$, $TiCl_4$, $SnCl_4$, etc., although they are, in most cases, highly discolored and for this reason, as well as the fact that such catalysts are corrosive, curing by radical generating systems is preferred.

For economical use, it is wasteful as well as unnecessary to use homopolymers of the monomers of this invention,

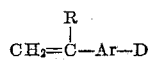

since the high activity of the polymers having such an abundance of

groups in the D function is not needed in most cases, although they can be used in moldings, laminations, and impregnations. In most applications, copolymers with other monomers are preferred, particularly after it was discovered that crosslinking convertibility is conferred on the copolymers which may be dipolymers, tripolymers, etc., depending on the number of additional monomers used as well as on the identity of the

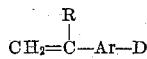

monomer which can contain more than one

function in the D moiety. In many cases copolymers containing 0.5 to 1% of the

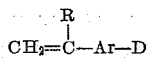

monomers are useful, but to achieve effective crosslinking at least 5% are preferable and 10 to 20% or 30% in the copolymer is advantageous. Accordingly, depending on the end product desired, and the use to which it is to be put, homopolymers as well as copolymers containing as little as 0.5% are useful. When less than 0.5%, such as 0.1%, are used, infusibility is diminished but the solubility is still reduced, when the copolymer is cured, and a noticeable increase in the viscosity of the polymer is observable in most cases as a result of large increases in molecular weight. Accordingly, a wide range of compositions can be made by copolymerizing these monomers with one or more other monomers containing a vinyl, $CH_2=CH-$, or a vinylidene group, $CH_2=C<$.

Illustrative examples of other monomers containing such groups are the acrylic esters such as methyl acrylate, ethyl acrylate, propyl acrylate, butyl acrylate, hexyl acrylate, phenyl acrylate, benzyl acrylate, methyl-α-chloroacrylate, etc.; the methacrylic esters such as methyl methacrylate, ethyl methacrylate, propyl methacrylate, methallyl methacrylate, etc.; the vinyl esters such as vinyl chloride, vinyl acetate, vinyl stearate, vinyl benzoate, vinyl methyl phthalate, vinyl ethyl succinate, etc.; the polymerizable amides and nitriles such as N,N-dimethyl acrylamide, N,N-diethyl methacrylamide, acrylonitrile, methacrylonitrile, etc.; the alkenyl aryl compounds such as styrene, o-methyl styrene, p-methyl styrene, α-methyl styrene, the chlorostyrenes, vinyl methoxybenzene, diallyl benzene, etc.; the vinylidene compounds such as vinylidene cyanide, methylene malonic esters, etc.; vinylene compounds such as vinylene carbonates, and the maleic esters, especially the maleic diesters of the lower alcohols; the itaconic compounds such as itaconic anhydride, the itaconic esters of the lower and higher aliphatic alcohols; the dienes such as butadiene, isoprene, and the like. The proportion of the new monomers in copolymers with other monomer will depend, in accordance with the accepted principles of copolymerization, on the reactivity and selectivity constants of the comonomers used in preparing the copolymer, the ratio of the monomers used and the extent of conversion. However, by selecting appropriate conditions for the copolymerization, copolymers, using the new monomers of this invention, can be made to contain effective and small amounts of these new monomers, for example, of the order of from 0.1% to 0.5% to very high amounts of the order of 99.5% to 99.9% in the final copolymer products.

In anionic copolymerization, the copolymerization parameters, $r_1$ and $r_2$ are sometimes influenced by the solvent if one is used. For example, when in a 50% benzene solution a mixture of 80% of

and 20% $CH_2=CHCOOC_2H_5$, Na is used as an initiator, and polymerized at 30° C., less than 2% of the acrylate feed is found in the copolymer. In contrast, when the copolymerization is performed in bulk without a solvent, about 35% of the acrylate is found in the copolymer. On the other hand, when the monomer

is copolymerized with $CH_2=CHC_6H_5$, 100% of the monomer is found in the copolymer whether the copolymerization is performed in solution or in bulk. Thus, while it is seen that some monomers polymerize less readily with the monomers of this invention, the resulting copolymers may still be used as post convertible compositions.

The polymers and copolymers of this invention may be used as prepared or blended or compounded with other polymers and ingredients. When prepared from pure monomers and in the absence of reacting impurities such as water, oxygen, acetylene, alcohols, etc., they are colorless or nearly so. Depending on the monomer and comonomers used, as well as the amount of initiator employed in the polymerization, the convertible polymers of this invention will vary from viscous liquids of low molecular weight to high melting solids of high molecular weight. As such, they can be used as such or modified for use as and in coatings, moldings, adhesives, lamination, encapsulations, etc., or they can be emulsified as used as latices for impregnations, etc. They can also be used with other film forming polymers such as nitrocellulose, etc. They may be used as blends with other film forming polymers, such as nitrocellulose, polyvinyl acetate, polymethyl methacrylate, polyvinyl chloride and its copolymers, polystyrene and its copolymers, especially the butadiene copolymers; the blends being achieved either in solution or in emulsion, or without solvents. The polymers and copolymers of this invention, including blends with other polymers, may be converted to varnishes, paints, enamels and impregnants in the usual way, and can be mixed with dyes, solvents, pigments, lubricants, stabilizers, etc., as is common in the coating arts. As such, they are useful not only as direct coatings, but are particularly satisfactory for the preparation of oil cloths, electrical oil cloth insulating tapes, rain coats, linoleums, inks, etc., when fabrics, paper, cloth, cork, mica, etc., are coated or impregnated with these compositions.

The alkenyl aryl monomers

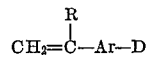

used in the practice of this invention can be readily prepared by the well-known methods of classical organic chemistry. For example, when D represents OR″ as in the ethers, the monomers are readily prepared using an appropriate phenol and R″ halide in the presence of an alkali, thus $$CH_2=\overset{R}{\underset{|}{C}}-Ar-OH + R''X \xrightarrow{NaOH} CH_2=\overset{R}{\underset{|}{C}}Ar-OR''$$

e.g.,

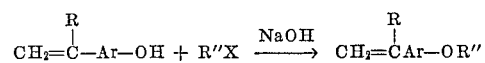

and

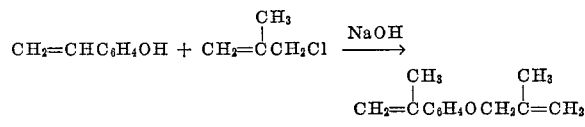

whereas when the thioether is required the thiophenol derivative is used with R″X, thus $$CH_2=CHC_6H_4SH + CH_2=CHCH_2Cl \xrightarrow{NaOH}$$
$$CH_2=CHC_6H_4SCH_2CH=CH_2$$

Also the vinyl ether derivatives can be prepared by the standard reaction of the phenol with acetylene in the presence of mercuric catalysts, thus $$CH_2=\overset{R}{\underset{|}{C}}-Ar-OH + CH\equiv CH \xrightarrow{cat.} CH_2=\overset{R}{\underset{|}{C}}-Ar-OCH=CH$$

e.g.,

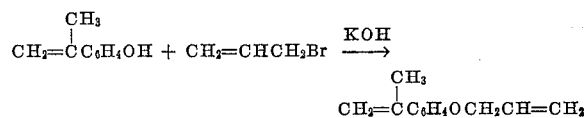

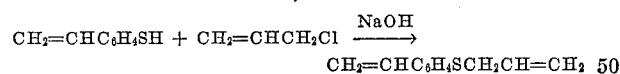

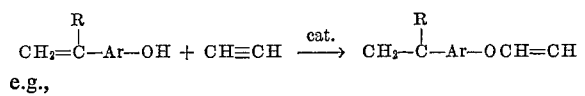

When D in these monomers represents —COOR″ they are easily prepared using an alkenyl aryl acyl chloride and the appropriate R″OH alcohol in the presence of a hydrohalide acceptor (HAC), thus $$CH_2=\overset{R}{\underset{|}{C}}-ArCOCl + R''OH \xrightarrow{HAC} CH_2=\overset{R}{\underset{|}{C}}ArCOOR''$$

e.g., $$CH_2=CHC_6H_4COCl + CH_2=CHCH_2OH \xrightarrow{HAC}$$
$$CH_2=CHC_6H_4COOCH_2CH=CH_2; \; CH_2=\overset{CH_3}{\underset{|}{C}}C_6H_4COCl +$$
$$CH_2=\overset{CH_3}{\underset{|}{C}}CH_2OCH_2CH_2OH \xrightarrow{HAC}$$
$$CH_2=\overset{CH_3}{\underset{|}{C}}C_6H_4COOCH_2OCH_2\overset{CH_3}{\underset{|}{C}}=CH_2$$

Instead of the acid chlorides, obviously the acid anhydrides, $$(CH_2=\overset{R}{\underset{|}{C}}-ArCO)_2O$$

may be used in the ester synthesis. Alternately these esters may be prepared by the reaction of $$CH_2=\overset{R}{\underset{|}{C}}-Ar-COOR''' + R''OH \longrightarrow$$
$$CH_2=\overset{R}{\underset{|}{C}}-Ar-COOR'' + R'''OH$$

wherein R‴ represents hydrogen and an alkyl group containing one to twelve carbon atoms; however, the lower alkyl esters such as the methyl and ethyl esters are preferred, e.g., $$CH_2=CHC_6H_4COOCH_3 + CH_2=CHCH_2OH$$
$$\rightarrow CH_2=CHC_6H_4COOCH_2CH=CH_2 + CH_3OH$$

Also, the vinyl derivatives can be prepared by the standard reaction of the acid or esters with a vinyl ester, e.g., vinyl acetate in the presence of a mercuric catalyst, thus $$CH_2=\overset{R}{\underset{|}{C}}ArCOOR''' + CH_2=CHOCOCH_3 \xrightarrow{cat.}$$
$$CH_2=\overset{R}{\underset{|}{C}}-Ar-COOCH=CH_2$$

e.g., $$CH_2=CHC_6H_4COOCH_3 + CH_2=CHOCOCH_3 \xrightarrow{cat.}$$
$$CH_2=CHC_6H_4COOCH=CH_2$$

etc.

When D in these monomers represents —ZOR″ they are easily prepared by reacting the appropriate alkenyl aryl alkyl halide with the appropriate alkali metal alcoholate of the R″ alcohol, thus $$CH_2=\overset{R}{\underset{|}{C}}-ArZCl + R''OM \longrightarrow MCl + CH_2=\overset{R}{\underset{|}{C}}-Ar-ZOR''$$

e.g., $$CH_2=CHC_6H_4CH_2Cl + NaOCH_2CH=CH_2 \longrightarrow$$
$$CH_2=CHC_6H_4CH_2OCH_2CH=CH_2 + NaCl$$

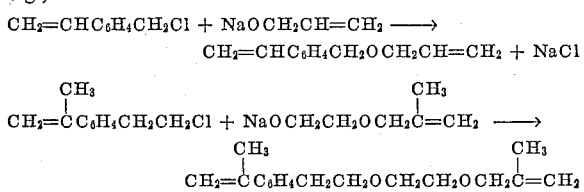

When D in the monomers

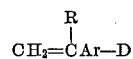

represents ZCOOR″, then the monomer can be readily prepared by using the appropriate alkenyl aryl alkylane acid chloride and the R″OH alcohol in the presence of a hydrohalide acceptor, thus $$CH_2=\overset{R}{\underset{|}{C}}ArZCOCl + R''OH \xrightarrow{HAC} CH_2=\overset{R}{\underset{|}{C}}ArZCOOR'', \text{ e.g.,}$$

$$CH_2=CHC_6H_4CH_2COCl + CH_2=CHCH_2OH \xrightarrow{HAC}$$
$$CH_2=CHC_6H_4CH_2COOCH_2CH=CH_2,$$

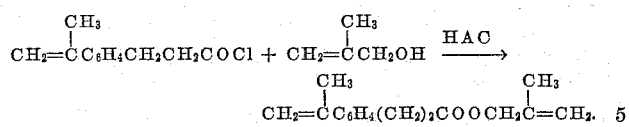

Alternately the acid anhydrides,

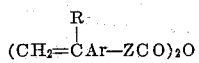

and the acid or lower alkyl esters,

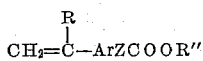

may be used as in the case of the synthesis of

Also the vinyl esters can be prepared by reacting the acid or ester with a vinyl ester, such as vinyl acetate or formate in the presence of a mercury catalyst, thus

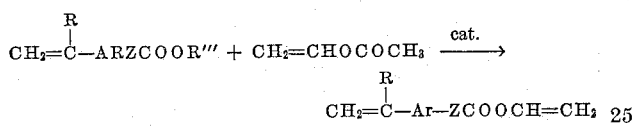

etc.

When D represents ZR'', these monomeric compounds are readily prepared by reacting the appropriate halides and organometal compounds such as Grignard reagents, the organo metallic compounds, e.g., lithium-alkyls and aryls, etc., thus

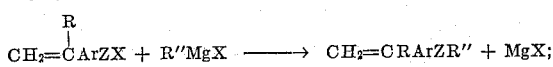

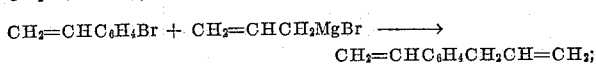

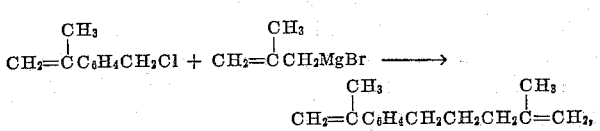

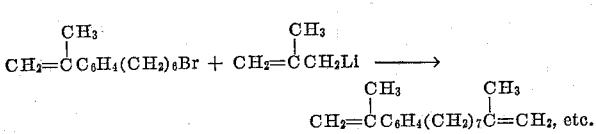

When D in the monomers represents

the monomers are readily prepared by reacting by alkylating an alkenyl aniline with the halides of R' and R'', thus

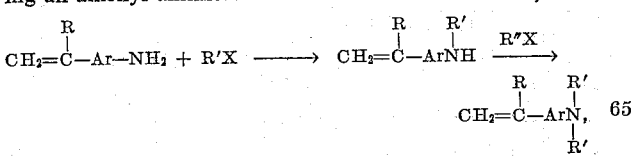

e.g.

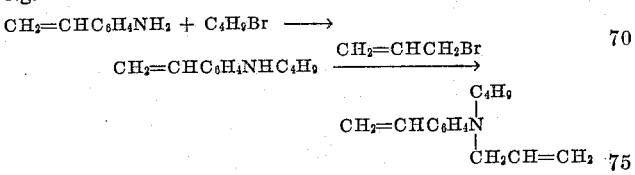

and when D represents

the monomer can be prepared readily by reacting the appropriate alkenyl aryl alkyl halides with the

amines, thus

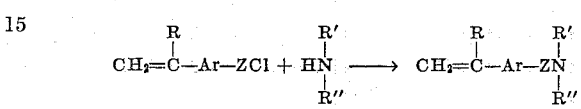

or the alkenyl aryl alkyl amine with the R' and R'' halides, thus

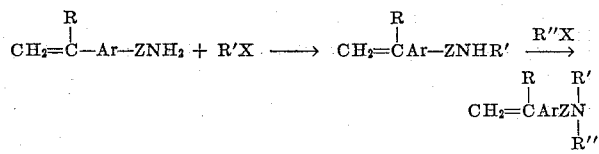

e.g.,

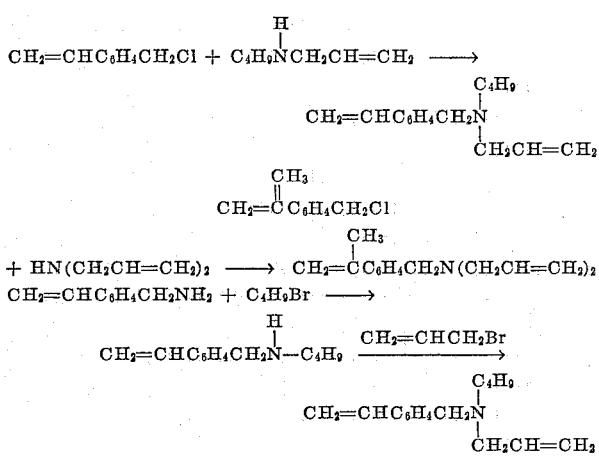

When D represents

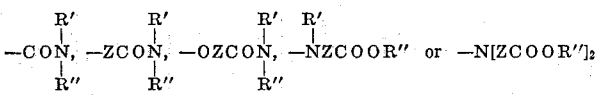

then the monomers can be readily prepared by reacting the corresponding and appropriate alkenyl aryl acid chloride, or anhydride with the corresponding amines,

HN
|
R'' thus illustrated by the chlorides in the presence of a hydrohalide acceptor, HAC:

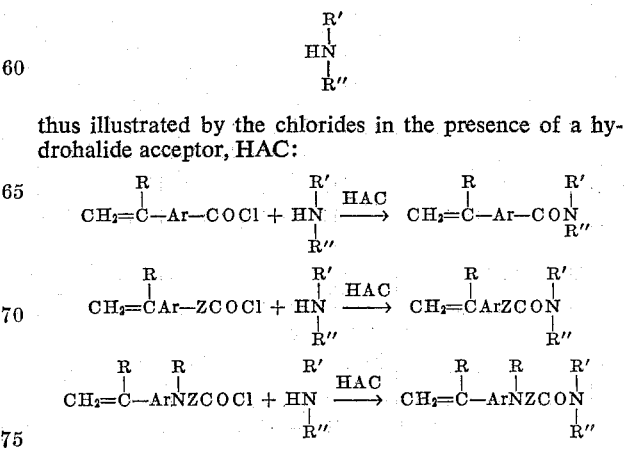

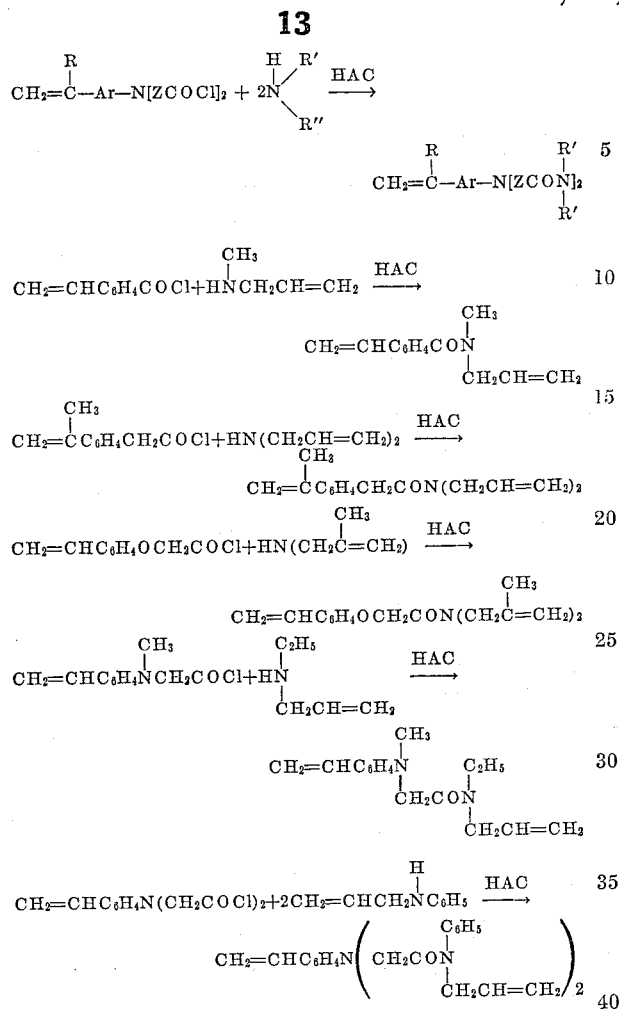

When D is OZCOOR'', or

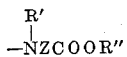

or N[ZCOOR'']₂ the esters are made using the R''OH alcohol and the same acid chlorides or anhydrides used in preparing the corresponding amides, thus

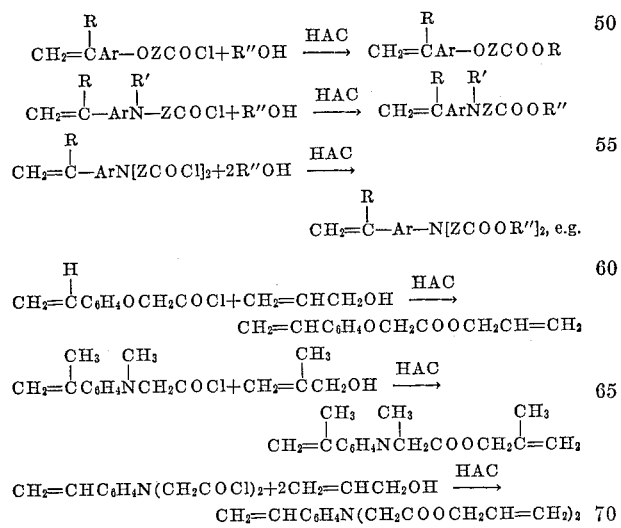

When D is

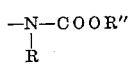

and —N(COOR'')₂ the monomers are made by reacting an alkenyl arylamine with a chlorocarbonate ester, thus

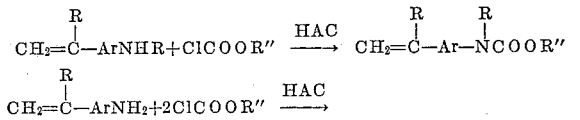

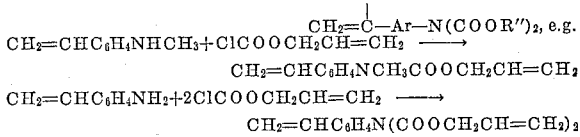

When D is SO₂OR'', the monomers may be prepared by the following reactions,

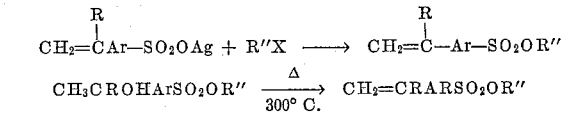

e.g.,

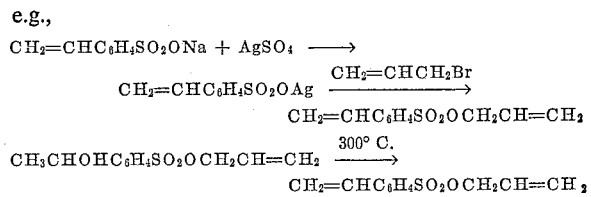

Therefore by the procedures described above the various monomers used in the practice of this invention can be prepared. The conditions are those of the standard types of reactions being used. The selection of appropriate components to give the desired compounds and appropriate conditions is within the skill of any chemist.

The following examples illustrate the practice of this invention and are used by way of illustration and not by way of limitation. All parts and percentages are by weight unless otherwise specified.

*Example I*

To 1000 parts of benzene in a reaction vessel equipped with stirrer, reflux condenser, nitrogen gas inlet, heating means, etc., is added 101 parts of triethylamine, 58 parts of allyl alcohol, one part of tertiary butyl catechol followed by the slow addition over the period of one hour of 166 parts of vinyl benzoyl chloride in 200 parts of benzene at 25° C. and the reaction continued for 5 hours at 35° C. The precipitated triethylamine hydrochloride is removed by filtration and the benzene solution washed with 5% Na₂CO₃ aqueous solution until neutral, then with two 500-portions of water. The benzene solution is next dried over anhydrous Na₂SO₄ and treated with decolorizing charcoal and filtered. The solution is divided into two parts, and the first part is found to be polymerizable. The benzene is removed from the second part at a reduced pressure of 5 mm., leaving a clear oil which is flash distilled at 0.01 mm. to give a water-white oil which, on analysis for carbon and hydrogen, gives values of 76.5% C and 6.47% H, which are in good agreement with the theoretical values for the compound

Titration with bromine confirms that the monomer has two double bonds by the formation of the derivative BRCH₂CHBrC₆H₄COOCH₂CHBrCH₂Br.

When, in this procedure, the vinyl benzoyl chloride is replaced in equivalent amount by the following acid chlorides:

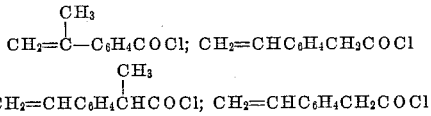

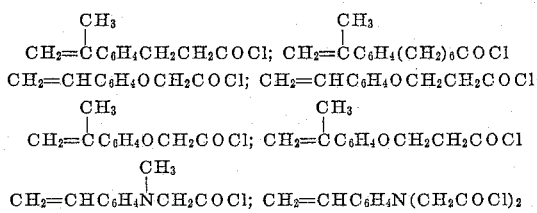

then the corresponding allyl esters are obtained.

When the allyl alcohol is replaced by equivalent amounts of the following R″OH compounds:

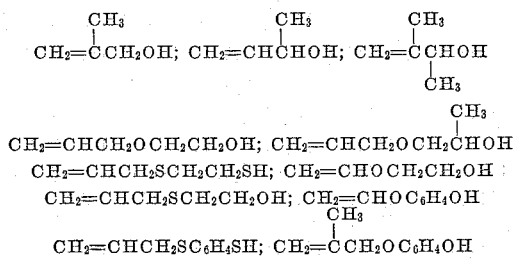

then the corresponding esters are obtained.

*Example II*

The procedure of Example I is repeated using 134 parts of sodium vinyl phenate and 121 parts of allyl bromide instead of the alkenyl aryl acid chloride, allyl alcohol, and the triethyl amine and there is obtained a 97% yield of $CH_2$=$CHC_6H_4OCH_2CH$=$CH_2$.

When methallyl bromide is used in equivalent amounts instead of the allyl halide, then the monomer

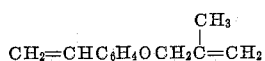

is obtained.

When sodium vinyl thiophenate is used instead of the vinyl phenate then the corresponding monomers

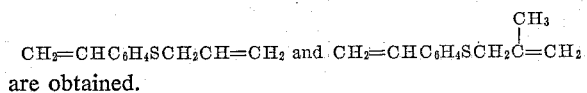

are obtained.

*Example III*

The procedure of Example II is repeated using 148 parts of sodium propenyl phenate,

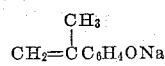

instead of the vinyl derivative and there are obtained with allyl bromide and methallyl bromide respectively, the monomers

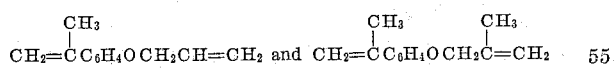

*Example IV*

The procedure of Example II is repeated using 152.5 parts of vinyl benzyl chloride and 80 parts of sodium allylate in the presence of a molar excess of allyl alcohol, and there is obtained the monomer $CH_2$=$CHC_6H_4CH_2OCH_2CH$=$CH_2$ B.P. 69–71° C. at 0.1–0.15 mm. pressure.

When 94 parts of sodium methallylate are used instead of the allylate, then the monomer

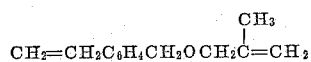

is obtained, and by substituting 166.5 parts of propenyl benzyl chloride for the vinyl benzyl chloride, the two monomers

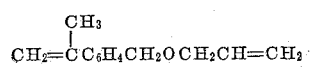

and

are obtained respectively with allyl chloride and methallyl chloride.

*Example V*

In a suitable reaction flask containing 1000 parts of dry ether is added 152.5 parts of vinyl benzyl chloride and one part of tertiary butyl catechol, followed by the addition at 20° C. of 131.5 parts of vinyl magnesium bromide in 1000 parts of ethyl ether and the mixture allowed to react for 10 hours. Then the reaction mass is heated to 40–50° C. for one hour. The precipitated magnesium halides are removed by filtration and the ether solution concentrated at 20° C. under reduced pressure, leaving an oil containing $CH_2$=$CHC_6H_4CH_2CH$=$CH_2$, which is steam-distilled at 10 mm. to produce a water-white oil which is dried with anhydrous sulfate. Elemental analysis of the oil gives values of 91.64% C and 8.30% H, which are in good agreement with the theoretical values for the compound of the formula $CH_2$=$CHC_6H_4CH_2CH$=$CH_2$, and which is confirmed by titration with $Br_2$ to the tetrabromide $BrCH_2CHBrC_6H_4CH_2CHBrCH_2Br$.

When 145.5 parts of allyl magnesium bromide or 48 parts of allyl lithium, $CH_2$=$CHCH_2Li$ are substituted for the vinyl magnesium bromide in this procedure, then the monomer $CH_2$=$CHC_6H_4CH_2CH_2CH$=$CH_2$ is obtained which also is confirmed by titration with bromine to the bromide, $BrCH_2CHBrC_6H_4CH_2CH_2CHBrCH_2Br$.

When in the procedure of this example 176.5 parts of propenyl benzyl chloride are used instead of the vinyl chloride, there are obtained the monomers

*Example VI*

The procedure of Example I is repeated using instead of allyl alcohol an equivalent amount of the following amines:

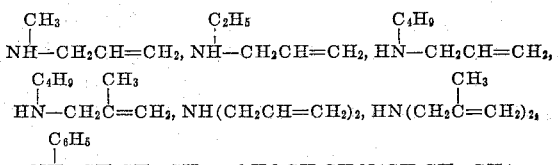

the corresponding monomers are obtained with

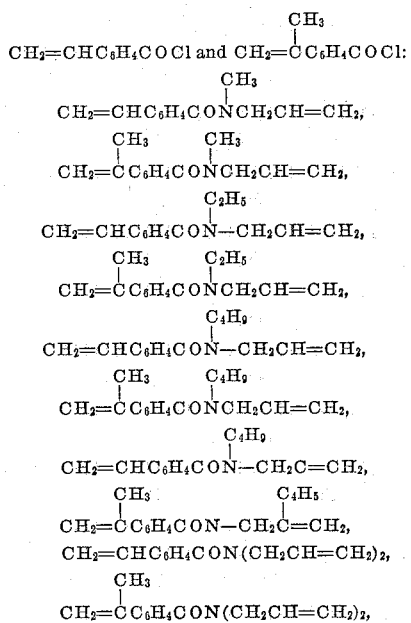

3,335,119

17

$$CH_2=CHC_6H_4CON(CH_2\underset{\underset{CH_3}{|}}{C}=CH_2)_2,$$

$$CH_2=\underset{\underset{CH_3}{|}}{C}C_6H_4CON(CH_2\underset{\underset{CH_3}{|}}{C}=CH_2)_2,$$

$$CH_2=CHC_6H_4CO\underset{\underset{C_6H_5}{|}}{N}-CH_2CH=CH_2,$$

$$CH_2=\underset{\underset{CH_3}{|}}{C}C_6H_4CO\underset{\underset{C_6H_5}{|}}{N}-CH_2CH=CH_2,$$

$$CH_2=CHC_6H_4COOCH_2CH_2N(CH_2CH=CH_2)_2,$$

$$CH_2=\underset{\underset{CH_3}{|}}{C}C_6H_4COOCH_2CH_2N(CH_2CH=CH_2)_2.$$

Example VII

The procedure of Example II is repeated using 152.5 parts of vinyl benzyl chloride and 114 parts of diallyliminodiacetate, $HN(CH_2COOCH_2CH=CH_2)_2$ and there is obtained the monomer $$CH_2=CHC_6H_4CH_2N(CH_2COOCH_2CH=CH_2)_2$$

whereas when 176.5 parts of propenyl benzyl chloride is used, the monomer obtained is $$CH_2=\underset{\underset{CH_3}{|}}{C}C_6H_4CH_2N(CH_2COOCH_2CH=CH_2)_2$$

Example VIII

The procedure of Example I is repeated using 119 parts of vinyl aniline, $CH_2=CHC_6H_4NH_2$, 242 parts of allyl bromide and 80 parts of NaOH in 1200 parts of dioxane and there is obtained the monomer $$CH_2=CHC_6H_4N(CH_2CH=CH_2)_2$$

When 133 parts of propenyl aniline is used instead of the vinyl aniline, the monomer obtained is $$CH_2=\underset{\underset{CH_3}{|}}{C}C_6H_4N(CH_2CH=CH_2)_2$$

Example IX

To 200 parts of freshly distilled anhydrous benzene is added 2.3 parts of micronized sodium and 100 parts of divinyl benzene under an inert atmosphere at 10° C. and the mixture agitated vigorously. After 10 hours the mixture is found to be gelled and the polymer, swollen by benzene, is insoluble. Similar insoluble polymers are obtained with diisopropenyl benzene, and with vinyl isopropenyl benzene. Insoluble, infusible polymers are also obtained with these monomers when K, Li, Cs, sodium naphthalene, butyl lithinm, sodamide and sodium benzophenone are used as initiators.

Example X

To 10 parts of each of the following monomers:

$$CH_2=CHC_6H_4COOCH_2CH=CH_2$$
$$CH_2=CHC_6H_4OCH=CH_2$$
$$CH_2=CHC_6H_4OCH_2CH=CH_2$$
$$CH_2=CHC_6H_4CH_2OCH_2CH=CH_2$$
$$CH_2=CHC_6H_4CH_2CH=CH_2$$
$$CH_2=CHC_6H_4CH=CH_2$$
$$CH_2=\underset{\underset{CH_3}{|}}{C}-C_6H_4CH_2CH=CH_2$$

and $$CH_2=CHC_6H_4CH_2N(CH_2COOCH_2CH=CH_2)_2$$

is added 0.2 part of benzoyl peroxide and the mixture heated at 60–90° C. for 24 hours. In all cases insoluble, infusible crosslinked polymers are obtained.

Example XI

To each of 10 parts of the monomers of Example X is added a mixture of 0.1 part of anhydrous AlCl₃ in 10 parts of benzene at room temperature, and an immediate exotherm occurs and insoluble polymers swollen by benzene are obtained.

18

Example XII

To a solution, in a suitable reactior, of 164 parts of $CH_2=CHC_6H_4COOCH_2CH=CH_2$ in 700 parts of anhydrous tetrahydrofuran under an inert atmosphere, cooled to −78° C. is added with rapid stirring 4.0 millimoles of butyl lithium (0.256 g.) in 5 parts benzene, and a brown color solution is formed with the internal temperature of the mixture increasing to about 5° C. After the exotherm subsides, the polymer solution is reacted at −78° C. for 90 minutes. The solution is then warmed to 25° C. and neutralized with acetic acid discharging the color and filtered. The solution can be used as such, or when the solid polymer is required or desired, it is isolated by pouring the tetrahydrofuran solution into 3000 parts of methanol. The resultant white polymeric precipitate is filtered and dried in a vacuum oven at 30° C. The yield of polymer is quantitative with a molecular weight of about 23,500 and a reduced viscosity in benzene at 25° C. of 1.1. Titration of the polymer with bromine indicates that there is one double bond in the polymer for each monomer or repeating unit, thus $$-\left(CH_2-CH\atop\underset{C_6H_4COOCH_2CH=CH_2}{|}\right)_n \longrightarrow$$

$$-\left(CH_2-CH\atop\underset{C_6H_4COOCH_2CHBrCH_2Br}{|}\right)_n$$

The polymer is soluble in acetone, chloroform, ethylene dichloride, benzene, toluene, xylene ethyl acetate, dioxane, and tetrahydrofuran.

Example XIII

The procedure of Example XII is repeated twice using 2 millimoles of butyl lithium instead of 4 and the white polymer obtained with this lower amount of initiator has a molecular weight of about 45,000.

Example XIV

The procedure of Example XII is repeated using 20 millimoles or butyl lithium instead of 4 millimoles and the polymer obtained has a molecular weight of about 4800.

Example XV

The procedure of Example XII is repeated using 84.6 parts of styrene and 16.4 parts of $$CH_2=CHC_6H_4COOCH_2CH=CH_2$$

as the monomer mixture and an almost quantitative yield of the copolymer containing the structural units in a 90:10 ratio, $$-\left(CH_2-CH\atop\underset{C_6H_5}{|}\right)_{90}\left(CH_2-CH\atop\underset{C_6H_4COOCH_2CH=CH_2}{|}\right)_{10}$$

is obtained.

Example XVI

The procedure of Example XII is repeated using 47 parts of styrene and 82 parts of $$CH_2=CHC_6H_4COOCH_2CH=CH_2$$

as the monomer mixture and a quantitative yield of the copolymer containing both structural units in a 50:50 ratio, $$-\left(CH_2CH\atop\underset{C_6H_5}{|}\right)_{50}\left(CH_2CH\atop\underset{C_6H_4COOCH_2CH=CH_2}{|}\right)_{50}$$

is obtained.

Example XVII

To a reactor equipped with stirrer, cooling and heating means, inert gas inlet, stirrer, etc., is added a solution of 55 parts of $CH_2=CHC_6H_4COOCH_2CH=CH_2$ in 550 parts of anhydrous benzene and to the mixture heated to 75° C. is added one millimole of butyl lithium in 2 parts of benzene and the mixture reacted for 1 hour. Gaseous HCl is passed into the mixture to neutralize the catalyst and discharge the anion color, the LiCl removed by filtration. The yield of polymer in benzene solution is quantitative and the solution can be used as such or the polymer isolated by precipitation with methanol according to the procedure of Example XII.

*Example XVIII*

The procedure of Example XII to XVII inclusive are repeated using instead of butyl lithium as the initiator, equivalent amounts of Na, K, Li, NaNH$_2$, KNH$_2$, LiAlH$_4$, sodium naphthalene, sodium benzophenone, and soluble, fusible linear polymers are obtained in all cases.

*Example XIX*

The procedure of Example XII is repeated until the exotherm subsides at −78° C., following which the temperature is raised to −10° C. and 20 parts of methyl methacrylate monomer is then added and stirring continued for 5 hours, and there is obtained in the solution 184 parts of a block copolymer of poly(allylvinylbenzoate)-polymethylmethacrylate in a weight ratio of 164 to 20 or a mol ratio of 1:0.2.

*Example XX*

The procedure of Example XII is repeated using instead of allylvinylbenzoate, $$CH_2=CHC_6H_4COOCH_2CH=CH_2$$

equivalent molar amounts of the monomers listed in Table 1, and in all cases soluble, fusible linear polymers containing the corresponding repeating unit are obtained, the polymers being soluble in acetone, chloroform, carbon tetrachloride, dioxane, tetrahydrofurane, benzene, toluene, dimethyl formamide, butyrolactone, dimethyl sulfoxide, trichloroethylene, divinyl benzene, styrene, and ethyl acetate.

TABLE 1

| | Monomer | Structural Unit in Polymer |
|---|---|---|
| (a) | $CH_2=\overset{CH_3}{\underset{|}{C}}C_6H_4COOCH_2CH=CH_2$ | $-CH_2-\overset{CH_3}{\underset{|}{C}}-$<br>$\quad\overset{|}{C_6H_4COOCH_2CH=CH_2}$ |
| (b) | $CH_2=CHC_6H_4CH_2COOCH_2CH=CH_2$ | $-CH_2CH-$<br>$\quad\overset{|}{C_6H_4CH_2COOCH_2CH=CH_2}$ |
| (c) | $CH_2=CHC_6H_4CH_2COOCH_2\overset{CH_3}{\underset{|}{C}}=CH_2$ | $-CH_2CH-\quad CH_3$<br>$\quad\overset{|}{C_6H_4CH_2COOCH_2\overset{|}{C}=CH_2}$ |
| (d) | $CH_2=CHC_6H_4OCH_2COOCH=CH_2$ | $-CH_2CH-$<br>$\quad\overset{|}{C_6H_4OCH_2COOCH=CH_2}$ |
| (e) | $CH_2=\overset{CH_3}{\underset{|}{C}}C_6H_4OCH_2COOCH_2CH=CH_2$ | $-CH_2\overset{CH_3}{\underset{|}{C}}-$<br>$\quad\overset{|}{C_6H_4OCH_2COOCH_2CH=CH_2}$ |
| (f) | $CH_2=CHC_6H_4N(CH_3)CH_2COOCH_2CH=CH_2$ | $-CH_2CH-$<br>$\quad\overset{|}{C_6H_4N(CH_3)CH_2COOCH_2CH=CH_2}$ |
| (g) | $CH_2=CHC_6H_4CH_2N(CH_2COOCH_2CH=CH_2)_2$ | $-CH_2CH-$<br>$\quad\overset{|}{C_6H_4CH_2N(CH_2COOCH_2CH=CH_2)_2}$ |
| (h) | $CH_2=\overset{CH_3}{\underset{|}{C}}C_6H_4COOCH=CH_2$ | $-CH_2-\overset{CH_3}{\underset{|}{C}}-$<br>$\quad\overset{|}{C_6H_4COOCH=CH_2}$ |
| (i) | $CH_2=\overset{H}{\underset{|}{C}}C_6H_4COOCH_2CH_2SCH_2CH=CH_2$ | $-CH_2CH-$<br>$\quad\overset{|}{C_6H_4COOCH_2CH_2SCH_2CH=CH_2}$ |
| (j) | $CH_2=CHC_6H_4OCH=CH_2$ | $-CH_2CH-$<br>$\quad\overset{|}{C_6H_4OCH=CH_2}$ |
| (k) | $CH_2=CHC_6H_4OCH_2CH=CH_2$ | $-CH_2CH-$<br>$\quad\overset{|}{C_6H_4OCH_2CH=CH_2}$ |
| (l) | $CH_2=CHC_6H_4OCH_2\overset{CH_3}{\underset{|}{C}}=CH_2$ | $-CH_2CH-\quad CH_3$<br>$\quad\overset{|}{C_6H_4OCH_2\overset{|}{C}=CH_2}$ |
| (m) | $CH_2=CHC_6H_4SCH_2CH=CH_2$ | $-CH_2CH-$<br>$\quad\overset{|}{C_6H_4SCH_2CH=CH_2}$ |
| (n) | $CH_2=\overset{CH_3}{\underset{|}{C}}C_6H_4OCH_2\overset{CH_3}{\underset{|}{C}}=CH_2$ | $-CH_2\overset{CH_3}{\underset{|}{C}}-\quad CH_3$<br>$\quad\overset{|}{C_6H_4OCH_2\overset{|}{C}=CH_2}$ |
| (o) | $CH_2=\overset{CH_3}{\underset{|}{C}}C_6H_4OCH_2CH=CH_2$ | $-CH_2-\overset{CH_3}{\underset{|}{C}}-$<br>$\quad\overset{|}{C_6H_4OCH_2CH=CH_2}$ |
| (p) | $CH_2=CHC_6H_4CH_2OCH_2CH=CH_2$ | $-CH_2CH-$<br>$\quad\overset{|}{C_6H_4CH_2OCH_2CH=CH_2}$ |

TABLE 1—Continued

| Monomer | Structural Unit in Polymer |
|---|---|
| (q) $CH_2=CHC_6H_4CH_2CH=CH_2$ | $-CH_2CH-$<br>$\quad\mid$<br>$\quad C_6H_4CH_2CH=CH_2$ |
| (r) $CH_2=CHC_6H_4CON(CH_3)CH_2CH=CH_2$ | $-CH_2CH-$<br>$\quad\mid$<br>$\quad C_6H_4CON(CH_3)CH_2CH=CH_2$ |
| (s) $CH_2=CHC_6H_4CON(C_6H_5)CH_2CH=CH_2$ | $-CH_2CH-$<br>$\quad\mid$<br>$\quad C_6H_4CON(C_6H_5)CH_2CH=CH_2$ |
| (t) $CH_2=CHC_6H_4CON(CH_2CH=CH_2)_2$ | $-CH_2CH-$<br>$\quad\mid$<br>$\quad C_6H_4CON(CH_2CH=CH_2)_2$ |
| (u) $CH_2=CHC_6H_4CH_2N(CH_2COOCH_2CH=CH_2)_2$ | $-CH_2CH-$<br>$\quad\mid$<br>$\quad C_6H_4CH_2N(CH_2COOCH_2CH=CH_2)_2$ |
| (v) $CH_2=CHC_6H_4SO_2OCH_2CH=CH_2$ | $-CH_2CH-$<br>$\quad\mid$<br>$\quad C_6H_4SO_2OCH_2CH=CH_2$ |
| (w) $CH_2=CHC_6H_4SCH_2CH=CH_2$ | $-CH_2CH-$<br>$\quad\mid$<br>$\quad C_6H_4SCH_2CH=CH_2$ |

*Example XXI*

The procedure of Example XII is repeated using 97.2 parts of α-methylstyrene, 17.8 parts of

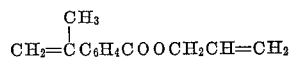

and 2 parts of metallic potassium and there is obtained a 90:10 copolymer containing the structural units

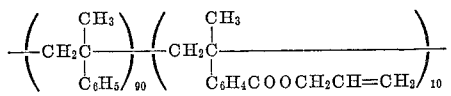

*Example XXII*

To a reaction flask under an inert atmosphere is added 250 parts of purified tetrahydrofurane and 20 milliequivalents of lithium naphthalene and the green-black mixture is cooled to −77° C., following which there is added 10.3 parts of styrene and the dark red color of the polystyrene dianion appears, and the reaction continued for one hour. There is then added 4.92 parts of $$CH_2=CHC_6H_4COOCH_2CH=CH_2$$

and the reaction continued for 2 hours, then allowed to come to room temperature. The solution is then neutralized with acetic acid and the polymer precipitated in methanol as in the procedure of Example XII. There is obtained a block copolymer of a 10:3 ratio of

to

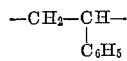

repeating structures in which the styrene structure comprises the central core of the polymer terminated at both ends by the vinyl benzoate ester structure,

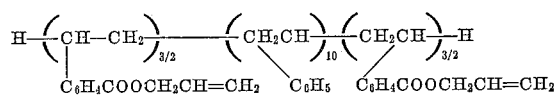

*Example XXIII*

Ten parts of the polymer of Example XII are dissolved in 20 parts of a mixture of 5 parts of dioxane and 15 parts of toluene and a film cast on glass from part of this solution, and the solvent allowed to evaporate at room temperature. At the end of 48 hours the film is still soluble in acetone, carbon tetrachloride, and dioxane.

When a portion of this film is (a) heated at 150° C. for 30 minutes in an oven, or (b) irradiated with a Van de Graaff linear accelerator or a cobalt 60 source to a dose of 5 or more megareps, the films become insoluble in these same solvents. To another portion of the solution is added benzoyl peroxide in an amount to correspond to 0.5% by weight of the polymer and films cast from the solution and the solvent allowed to evaporate at room temperature for 48 hours. When this film is heated at 135–150° C. for 2 minutes, it becomes insoluble and infusible.

*Example XXIV*

To 40 parts of the polymer of Example XII is added 0.4 part of benzoyl peroxide and the mixture ball milled to uniformity for 15 minutes. The mixture is then pressed in a heated compression mold for 2 minutes at 150° C. and a well-fused, well-knit thermoset molding obtained which is insoluble in benzene and toluene. Similar results are obtained when other catalysts such as 2,2′-azobisisobutyronitrile, lauroyl peroxide, tertiary butyl perbenzoate, etc. are used instead of benzoyl peroxide.

*Example XXV*

Impregnated sheet-stock is prepared by dipping sheets of cellulose paper in the polymer solution of Example XXIII containing the benzoyl peroxide, the sheets dried at 100° C. for 20 minutes. Six sheets are superimposed and placed between the platens of a press and heated to 135° C. for 15 minutes at a pressure of 200 p.s.i. A well-bonded, thermoset laminated product is obtained.

*Example XXVI*

The copolymerization procedure of Example XVI is repeated using instead of 47 parts of styrene, the various amounts of the following monomers or mixtures of monomers.

| | |
|---|---|
| 5 parts | $CH_2=C(CN)-COOCH_3$ |
| 18 parts | $CH_2=CHCOOCH_2C_6H_4Cl$ |
| 12 parts | $CH_2=C(CH_3)COOCH_2CH_2CN$ |
| 3 parts | $CH_2=C(CH_3)-COSC_2H_5$ |
| 3 parts | $CH_2=CHCON(CH_3)_2$ |
| 6 parts | $CH_2=CHCN$ |
| 8 parts | $CH_2=C(CH_3)CN$ |
| 1 part | $CH_2=C(CN)_2$ |
| 12 parts | $\{6CH_2=CHC_6H_5$ ; $6CH_2=CHCOOC_2H_5\}$ |
| 12 parts | $\{6CH_2=C(CH_3)C_6H_5$ ; $6CH_2=C(CH_3)COOC_4H_9\}$ |

In all cases almost quantitative yields of copolymers are obtained.

Example XXVII

Example XXIII is repeated with the polymers of Examples XX, XXI, and XXII, and similar results are obtained.

Example XXVIII

Example XXIV is repeated with the polymers of Examples XX, XXI and XXII, and similar results are obtained.

Example XXIX

Example XXV is repeated with the polymers of Examples XX, XXI, and XXII, and similar results are obtained.

Example XXX

Example XXVI is repeated with the polymers of Examples XX, XXI and XXII, and similar results are obtained.

Example XXXI

To a solution of 10 parts of the polymer of Example XII in 30 parts of tetrahydrofurane is added 0.1 part of benzoyl peroxide and 2 parts of allyl monoitaconate,

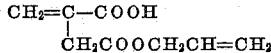

and the films prepared on freshly sanded iron, steel, copper, and aluminum sheets and cured at 160° C. for two hours. In all cases, the film yielded is quantitative to films in which the allyl itaconate is omitted. Instead of monoallyl itaconate, other acidic monomers, such as acrylic acid, methacrylic acid, maleic half esters, etc., can be used and produce similar results.

Example XXXII

The procedure of Example XXXI is repeated using the polymers of Examples XX, XXI, and XXII and similar results are obtained.

Example XXXIII

Ten parts of the polymer of Example XII are mixed with 20 parts of commercial divinyl benzene containing a 50–50 mixture of divinyl benzene and ethyl vinyl benzene containing 0.3 part of benzoyl peroxide and to the resulting soft viscous mixture is added 30 parts of ground mica to form a putty which is molded at 140° C. at low pressures of 30–100 p.s.i. into heat and solvent resistant structures.

Similar results are obtained when the divinyl benzene is replaced by allyl methacrylate, glycol dimethacrylate, diallyl itaconate, diallyl fumarate, diallyl maleate, divinyl phthalate, diallyl phthalate or diallyl succinate, etc.

Example XXXIV

The procedure of Example XXXIII is repeated with the polymers of Examples XX, XXI, and XXII, and similar results are obtained.

Example XXXV

Glass-woven fabric is dip-treated with a solventless commercial liquid unsaturated polyester resin (50% styrene–50% phthalic modified glycol maleate containing 0.5% peroxy catalyst) in which is dissolved 10% by weight of the polymer of Example XIV, and the coated fabric is then converted to a glass laminate by stacking 4 sheets between metal platens coated with zinc stearate and cured at 120° C. at 10 p.s.i. The laminate containing the polymer of Example XIV cures in less than 15 minutes and is more stiff and more heat-resistant than a similar product made from a polyester not containing the added polymer of Example XVI.

Example XXXVI

The procedure of Example XXXV is repeated using the polymers of Examples XX, XXI, and XXII and similar results are obtained.

Example XXXVII

To a mixture of 35 parts of toluene and 5 parts of acetone is added 15 parts of the polymer of Example XII, 3 parts of allyl monoitaconate and 0.5 part of 2,2'-azobisisobutyronitrile and the mixture stirred until homogeneous. The inside of a clean iron pipe of 3" I.D. is centrifugally spray-coated while the pipe, heated to 80° C., is rotated and the solvent allowed to evaporate and the temperature raised to 170° C., and curing is continued for about 5 minutes. A solvent resistant, heat resistant internally coated pipe of good quality is obtained.

Example XXXVIII

The procedure of Example XXXVII is repeated using the polymers of Examples XX, XXI, and XXII and similar results are obtained.

Example XXXIX

Continuous strips of aluminum are coated with the polymer solution of Example XXXVII and dried at 60° C. The solvent dried but uncured strips are fabricated into cans by the process of U.S. Patent 2,982,457, May 2, 1961, and after forming are clamped while on the mandrel and heated to 200° C. for 30 seconds. Heat resistant tubular laminated cans are obtained. When the treated strips are spiral wound and then heat-treated as in the making of the can, continuous pipe is produced. Similar results are obtained when copper, iron, silver, etc. metals are processed in the same way as the aluminum strips.

Example XL

An enamel is produced by adding milled $TiO_2$ pigment to the polymer solution of Example XXXVII so that the pigment-binder ratio is 60:40 and the surface-ground concrete blocks are coated with the varnish, the solvent allowed to evaporate at 60° C., then the coated blocks are heated under infrared lamps at 180° C. for 15 minutes in a continuous oven, and a glassy porcelain-like finish which is water, heat and solvent resistant, is obtained. A similar finish is obtained on oak, maple, cedar, pine, and mahogany panels, as well as on fiber boards, asbestos panels and concrete castings.

*Example XLI*

The procedure of Example XXXIX is repeated using the polymers of Examples XX, XXI, and XXII and similar results are obtained.

*Example XLII*

The procedure of Example XL is repeated using the polymers of Examples XX, XXI, and XXII and similar results are obtained.

Having described my invention, what I desire to secure by Letters Patent are the following claims:

1. A linear polymer consisting essentially of a plurality of repeating units of the formula $$-CH_2-\underset{\underset{Ar-D}{|}}{\overset{\overset{R}{|}}{C}}-$$

wherein

R represents a radical selected from the class of H and $CH_3$;
Ar represents an arylene hydrocarbon radical containing at least 6 and no more than 18 carbon atoms;
D represents a member selected from the class of —ZR″, —OR″, —SR″, —OZCOOR″, —ZCOOR″, —ZOR″, $$-\underset{\underset{R''}{|}}{\overset{\overset{R'}{|}}{N}},\ -\underset{\underset{R''}{|}}{\overset{\overset{R'}{|}}{CON}},\ -\underset{\underset{R''}{|}}{\overset{\overset{R'}{|}}{ZN}},\ -\underset{\underset{R''}{|}}{\overset{\overset{R'}{|}}{ZCON}},\ -\underset{\underset{R''}{|}}{\overset{\overset{R'}{|}}{OZCON}}$$

$$-NR'ZCOOR'',\ -N[ZCOOR'']_2,\ -\underset{\underset{}{}}{\overset{\overset{R'}{|}}{N}}(COOR'')_2$$

and —$SO_2R''$ groups in which R′ is a radical selected from the class of hydrocarbon radicals containing at least one and no more than ten carbon atoms and R″, and R‴ is a radical selected from the class of alkenyl, alkenyloxyalkyl and alkenylthioalkyl radicals, said radicals containing two to ten carbon atoms and possessing a terminal $CH_2=C<$ group, and Z is a divalent aliphatic hydrocarbon radical having at least one and no more than 10 carbon atoms.

2. A linear polymer of claim 1 in which the repeating unit has the formula $$-CH_2-\underset{\underset{C_6H_4COOCH_2CH=CH_2}{|}}{\overset{\overset{H}{|}}{C}}-$$

3. A linear polymer of claim 1 in which the repeating unit has the formula $$-CH_2-\underset{\underset{C_6H_4COOCH_2CH=CH_2}{|}}{\overset{\overset{CH_3}{|}}{C}}-$$

4. A linear polymer of claim 1 in which the repeating unit has the formula $$-CH_2CH-\atop{\underset{C_6H_4OCH_2CH=CH_2}{|}}$$

5. A linear polymer of claim 1 in which the repeating unit has the formula $$-CH_2\underset{\underset{C_6H_4OCH_2CH=CH_2}{|}}{\overset{\overset{CH_3}{|}}{C}}-$$

6. A linear polymer of claim 1 in which the repeating unit has the formula $$-CH_2CH-\atop{\underset{C_6H_4OCH_2COOCH_2CH=CH_2}{|}}$$

7. A linear polymer of claim 1 in which the repeating unit has the formula $$-CH_2\underset{\underset{C_6H_4OCH_2COOCH_2CH=CH_2}{|}}{\overset{\overset{CH_3}{|}}{C}}-$$

8. A linear polymer of claim 1 in which the repeating unit has the formula $$-CH_2CH-\atop{\underset{C_6H_4CH_2OCH_2CH=CH_2}{|}}$$

9. A linear polymer of claim 1 in which the repeating unit has the formula $$-CH_2-\underset{\underset{C_6H_4CH_2OCH_2CH=CH_2}{|}}{\overset{\overset{CH_3}{|}}{C}}-$$

10. A linear polymer of claim 1 in which the repeating unit has the formula $$-CH_2-CH-\atop{\underset{C_6H_4CH_2CH=CH_2}{|}}$$

11. A linear polymer of claim 1 in which the repeating unit has the formula $$-CH_2\underset{\underset{C_6H_4CH_2CH=CH_2}{|}}{\overset{\overset{CH_3}{|}}{C}}-$$

12. A linear polymer of claim 1 in which the repeating unit has the formula $$-CH_2-CH-\atop{\underset{C_6H_4CH_2CH_2CH=CH_2}{|}}$$

13. A linear polymer of claim 1 in which the repeating unit has the formula $$-CH_2\underset{\underset{C_6H_4CH_2CH_2CH=CH_2}{|}}{\overset{\overset{CH_3}{|}}{C}}-$$

14. A linear polymer of claim 1 in which the repeating unit has the formula $$-CH_2CH-\atop{\underset{C_6H_4CH_2N(CH_2COOCH_2CH=CH_2)_2}{|}}$$

15. A linear polymer of claim 1 in which the repeating unit has the formula $$-CH_2\underset{\underset{C_6H_4CH_2N(CH_2COOCH_2CH=CH_2)_2}{|}}{\overset{\overset{CH_3}{|}}{C}}-$$

16. A linear polymer of claim 1 which has in the polymer molecule the additional structural unit $$-CH_2CH-\atop{\underset{C_6H_5}{|}}$$

17. A linear polymer of claim 1 which has in the polymer molecule the additional structural unit $$-CH_2\underset{\underset{C_6H_5}{|}}{\overset{\overset{CH_3}{|}}{C}}-$$

18. A linear polymer of claim 1 which has in the polymer molecule the additional structural unit $$-CH_2\underset{\underset{COOR'}{|}}{\overset{\overset{CH_3}{|}}{C}}-$$

19. A mixture comprising a polymer of claim 1 and at least one ethylenic monomer.

20. A heat-converted insoluble polymer comprising the product obtained by crosslinking the linear polymer of claim 1.

21. A monomer of the formula $$CH_2=\underset{\underset{R}{|}}{C}-Ar-D$$

in which
R represents a radical selected from the class of H and $CH_3$,
Ar represents an arylene radical containing at least 6 and no more than 18 carbon atoms,
D represents a radical selected from the class of —SR″, —OZCOOR″, —ZCOOR″, —ZOR″, $$-\underset{\underset{R''}{|}}{\overset{\overset{R'}{|}}{N}}, -CO\underset{\underset{R''}{|}}{\overset{\overset{R'}{|}}{N}}, -Z\underset{\underset{R''}{|}}{\overset{\overset{R'}{|}}{N}}, -ZCO\underset{\underset{R''}{|}}{\overset{\overset{R'}{|}}{N}}, -OZCO\underset{\underset{R''}{|}}{\overset{\overset{R'}{|}}{N}}, -NR'ZCOOR''$$

$$-N[ZCOOR'']_2, -\underset{\underset{R''}{|}}{\overset{\overset{R'}{|}}{N}}COOR'', -N(COOR'')_2$$

and —$SO_2OR''$ in which R′ is a radical selected from the class of hydrocarbon radicals containing at least one and no more than ten carbon atoms and R″, and R″ is a radical selected from the class of alkenyl, alkenyloxyalkyl and alkenylthioalkyl radicals, said R″ radicals containing at least two and no more than ten carbon atoms and possessing a terminal $CH_2=C<$ group, and Z represents an aliphatic hydrocarbon radical of at least one and no more than 10 carbon atoms.

References Cited
UNITED STATES PATENTS

| | | | |
|---|---|---|---|
| 2,418,978 | 4/1947 | Mertens | 260—886 |
| 2,443,217 | 6/1948 | Amos et al. | 260—669 |
| 2,656,341 | 10/1953 | D'Alelio | 260—47 |

OTHER REFERENCES

Die Makromolecular Chemie, vol. 54, pages 119–125.

JOSEPH L. SCHOFER, *Primary Examiner.*

M. L. BERCH, S. M. LEVIN, *Assistant Examiners.*